Patented June 20, 1933

1,914,953

UNITED STATES PATENT OFFICE

BORIS MALISHEV, OF BERKELEY, CALIFORNIA, ASSIGNOR TO SHELL DEVELOPMENT COMPANY, OF SAN FRANCISCO, CALIFORNIA, A CORPORATION OF DELAWARE

MANUFACTURING AND REFINING MINERAL OILS

No Drawing.   Application filed December 27, 1930.   Serial No. 505,200.

This invention relates to the manufacture and refining of mineral oils by means of phosphorous pentoxide.

A further feature is the employment of a supplemental refining agent which aids to sweeten the gasoline and increases the stability of the gasoline toward light.

In my process the mineral oil while being treated may be either in the liquid or the vapor state.

$P_2O_5$, which I use as catalyst, appears to act as a condensing and cracking catalyst, although I do not wish to be bound to any theory. Regardless of the causes and manner of the action of $P_2O_5$, it does exert a remarkable refining action on the mineral oil treated in the manner set out in this specification, as evidenced by the numerous detailed examples, which are given only for purposes of illustration.

The $P_2O_5$ must be used in an anhydrous state, as any trace of water would tend to convert it into phosphoric acids, which possess no effect in my process. Specifically, ortho-, meta-, and pyro-phosphoric acids are ineffective in my process to refine petroleum products containing olefines and other unstable, unsaturated hydrocarbons. According to my belief, the $P_2O_5$ acts as a condensation and cracking catalyst with accompanying removal of water, while ortho-, meta-, and pyro-phosphoric acids, regarded as hydrates of $P_2O_5$, cannot accomplish the desired result due to the presence of water in their composition.

Before the $P_2O_5$ treatment, the light mineral oil distillate to be treated is preferably washed with weak acid in order to remove the nitrogen bases, and then dried, otherwise a greater quantity of $P_2O_5$ is required to effect refining. When such a washing is required, ortho-phosphoric acid obtained by leaching the still residues from previous $P_2O_5$ treatments may be used. After the washing the spent phosphoric acid can be employed in manufacturing fertilizers; this makes my process very economical.

I have found that if an inert substance, such as sand, etc., is added to the mass, the former increases the surface of contact between the catalyst and light mineral oil distilled by disintegrating the $P_2O_5$ catalyst.

The light mineral oil distillate treated with $P_2O_5$ yields a colorless gasoline of 30+ Saybolt; however, I have found it preferable to employ a supplemental refining agent in conjunction therewith.

I have found that oxidized mineral oils or bitumens such as asphalt, coal tar pitch, wood tar pitch, hardwood pitch, etc., which contain organic oxy compounds, are especially suitable in conjunction with $P_2O_5$ in refining light mineral oil distillates, and the gasoline obtained is more stable to light, substantially gum free and better sweetened. As an example: 24 gm. of phosphorus pentoxide and 6 gm. of asphalt are added to 1200 gm. of light mineral oil distillate and the mass distilled during five hours with continuous stirring without the use of pressure. The distilled gasoline is then finished with a soda wash. The finished product is colorless, color-stable, sweet, substantially gum free, of pleasant odor and of undiminished anti-knock value.

I have found that certain organic oxy-compounds such as aldehydes, ketones and salts of organic acids comprising such compounds as benzophenone, copper oleate, copper acetate, copper naphthenate, etc. are also very effective in exerting a supplemental refining action on the light mineral oil distillate and can be employed in lieu of the oxidized mineral oils or bitumens or in conjunction therewith. As examples:

I. 24 gm. of phosphorous pentoxide, 24 gm. benzophenone, and 48 gm. sand are added to 1200 gm. of pressure distillate and the mass distilled during five hours with continuous stirring at atmospheric pressure. A sweet gasoline of 30 Saybolt is obtained with only 4 mg. gum in 100 c. c.

II. A light mineral oil distillate, as pressure distillate, is treated in an autoclave with 10% $P_2O_5$, 17% copper naphthenate (containing 3% copper) and 30% sand for three hours at 200° C. A sweet gasoline of 30+ Saybolt is obtained.

III. Vapors of unrefined gasoline are passed through a treater containing copper oleate, wood-tar pitch and $P_2O_5$ at a temperature ranging between 150° and 225° C., yielding a refined gasoline of 30 Saybolt.

Untreated vapor-phase cracked distillate can readily be refined with a mixture of $P_2O_5$ and organic copper salts exactly as is done in the case of pressure distillate. The high anti-knock value of the gasoline was not diminished by this treatment.

In lieu or in conjunction with the aforementioned supplemental refining agents, may be used metallic halides, such as $CuCl_2$, $FeCl_3$, $SbCl_3$, etc.

The process may be carried out at ordinary, elevated, or reduced pressure. High pressure, however, is an undesirable factor because it favors polymerization of hydrocarbons in the presence of many catalysts. Excessive condensation reactions above those required to remove objectionable impurities are not desirable in refining light mineral oil distillates because such reactions will increase the amount of higher boiling hydrocarbons and decrease the yield of gasoline.

The described process for the production of motor fuel is applicable to all light fractions of mineral and synthetic oils such as shale oils, Bergius process oils, hydrogenated oils, etc., and is particularly adaptable to light oils obtained by a cracking process. The operating range of temperature is between 130° and 250° C. at atmospheric pressure, although variations are to be expected, depending upon the nature of the materials, concentrations and pressures employed.

The process of my invention is simple and economical. The gasoline produced thereby has a pleasant odor, is colorless and stable in color, is doctor sweet and non-corrosive, is substantially gum-free, and possesses high anti-knock properties.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained. On the other hand, the invention is to be regarded as limited only by the terms of the accompanying claims in which it is my intention to claim all novelty inherent therein as broadly as is possible in view of the prior art.

I claim as my invention:

1. A process for obtaining refined gasoline from light mineral oil distillates comprising agitating substantially anhydrous light mineral oil distillates with phosphorus pentoxide while distilling.

2. A process for obtaining refined gasoline from light mineral oil distillates comprising agitating substantially anhydrous light mineral oil distillates with phosphorus pentoxide and a metallic halide while distilling.

3. A process for obtaining refined gasoline from light mineral oil distillates comprising agitating substantially anhydrous light mineral oil distillates with phosphorus pentoxide and a metallic salt of an organic acid while distilling.

4. A process for obtaining refined gasoline from light mineral oil distillates comprising agitating substantially anhydrous light mineral oil distillates with phosphorus pentoxide and an oxygen-containing asphaltic compound while distilling.

5. A process for obtaining refined gasoline from light mineral oil distillates comprising agitating substantialy anhydrous light mineral oil distillates with phosphorus pentoxide and an organic oxy-compound which exerts a supplemental refining action while distilling.

6. A process for obtaining refined gasoline from light mineral oil distillates comprising agitating substantially anhydrous light mineral oil distillates with phosphorus pentoxide and an inert material, which disintegrates the phosphorus pentoxide catalyst while distilling.

7. A process for obtaining refined gasoline from light mineral oil distillates comprising washing the light mineral oil distillates with dilute acid and agitating the washed distillate in the substantially anhydrous state with phosphorus pentoxide in the presence of a secondary refining agent while distilling.

8. A process for obtaining refined gasoline from light mineral oil distillates comprising washing the light mineral oil distillates with phosphoric acid and agitating the washed distillate in the substantially anhydrous state with phosphorus pentoxide while distilling.

9. A process for obtaining refined gasoline from light mineral oil distillates comprising heating light mineral oil distillates in the substantially anhydrous state to a temperature of about 130–250° C. at atmospheric pressure in the presence of phosphorus pentoxide.

10. A process for obtaining refined gasoline from cracked distillate comprising agitating cracked distillate in the substantially anhydrous state with phosphorous pentoxide while distilling.

11. A process for obtaining refined gasoline from cracked distillate comprising agitating cracked distillate in the substantially anhydrous state with phosphorus pentoxide and a secondary refining agent while distilling.

12. A process for obtaining refined gasoline from cracked distillate comprising agitating cracked distillate in the substantially anhydrous state with phosphorus pentoxide, a secondary refining agent and an inert material while distilling.

13. A process for obtaining refined gasoline from pressure distillate comprising agitating pressure distillate in the substantially anhydrous state with phosphorus pentoxide while distilling.

14. A process for obtaining refined gasoline from pressure distillate comprising agitating pressure distillate in the substantially anhydrous state with phosphorus pentoxide and a secondary refining agent while distilling.

15. A process for obtaining refined gasoline from pressure distillate comprising agitating pressure distillate in the substantially anhydrous state with phosphorus pentoxide, a secondary refining agent and an inert material while distilling.

16. A process for obtaining refined gasoline comprising treating vapors of unrefined gasoline in the substantially anhydrous state with phosphorus pentoxide.

17. A process for obtaining refined gasoline from cracked distillates comprising treating vapors of unrefined gasoline in the substantially anhydrous state with phosphorus pentoxide, and a secondary refining agent.

18. A process for obtaining refined gasoline from pressure distillate comprising treating vapors of unrefined gasoline in the substantially anhydrous state with phosphorus pentoxide and a secondary refining agent at a temperature of about 150–225° C.

19. A process for obtaining refined gasoline from light mineral oil distillates comprising subjecting said light distillates in the substantially anhydrous state to thermal treatment in the presence of phosphorus pentoxide.

20. A process for obtaining refined gasoline from light mineral oil distillates comprising subjecting said light distillates in the substantially anhydrous state to thermal treatment in the presence of phosphorus pentoxide and a condensing catalyst.

21. A process for obtaining refined gasoline from light mineral oil distillates comprising subjecting said light distillates in the substantially anhydrous state to thermal treatment in the presence of phosphorus pentoxide and a heavy metal compound.

22. A process for obtaining refined gasoline from light mineral oil distillates comprising subjecting said light distillates in the substantially anhydrous state to thermal treatment in the presence of phosphorus pentoxide and a heavy metal salt.

23. A process for obtaining refined gasoline from light mineral oil distillates comprising subjecting said light distillates in the substantially anhydrous state to thermal treatment in the presence of phosphorus pentoxide and a heavy metal halide.

24. A process for obtaining refined gasoline from light mineral oil distillates comprising subjecting said light distillates in the substantially anhydrous state to thermal treatment in the presence of phosphorus pentoxide and a compound of copper.

25. A process for obtaining refined gasoline from light mineral oil distillates comprising subjecting said light distillates in the substantially anhydrous state to thermal treatment in the presence of phosphorus pentoxide and a halide of copper.

In testimony whereof, I have hereunto set my hand.

BORIS MALISHEV.